Patented Oct. 24, 1933

1,932,087

UNITED STATES PATENT OFFICE 1,932,087

MAKING TITANIUM DIOXIDE

Hartmut W. Richter, Elizabeth, N. J.

No Drawing. Application August 12, 1930
Serial No. 474,880

5 Claims. (Cl. 23—202)

This invention relates to making titanium dioxide; and it comprises a method of recovering $TiO_2$ in readily available form from intractable minerals, such as ilmenite and rutile, wherein such a mineral in finely powdered form is intimately admixed with a small amount of alkali, advantageously by being made into a paste with a limited amount of caustic alkali solution, advantageously in the presence of some carbonated alkali, the paste being then dried and carefully heated to a temperature below that at which any visible fusion occurs; all as more fully hereinafter set forth and as claimed.

Many methods have been proposed for the recovery of titanium dioxide in available form from titanium minerals, such as rutile and ilmenite or menaccanite; but a ready and economical method permitting a large throughput with simple types of apparatus, is still a desideratum. On of the known ways of opening up these minerals is fusion with caustic or with carbonated alkali. This is efficient, but the temperatures required are very high and it is difficult to provide apparatus withstanding the action of the alkali. Sometimes, alkaline sulfids are used in lieu of caustic alkali and these are even harder on the apparatus. It is because of apparatus difficulties, largely, that these alkaline fusion methods have been discarded.

I have found that fusion is by no means necessary and these intractable minerals can be opened up by caustic alkali at a relatively low temperature and without any fusion; the reaction mass being, as a matter of fact, handled as a granular or powdery body. The mixture of alkali and mineral in this granular form can be readily handled in ordinary furnace apparatus of ordinary materials, rotary drums, for example, without attacking the linings.

While it had long been known that reactive forms of $TiO_2$, such as metatitanic and orthotitanic acid, titanium sulfate and the like, undergo fairly ready reaction with alkaline solutions, it was not known that the raw, crystallized minerals at a slightly higher temperature would react with alkali as a substantially dry and unfused mixture. This dry reaction forms the basis of the present invention.

I have found that when finely ground rutile or ilmenite is intimately admixed with fine ground caustic soda or is made into a paste with a solution of caustic soda in about the proportion of 2NaOH for each $TiO_2$, the paste being dried, and the mixture being then heated to a relatively moderate temperature, full reaction on the $TiO_2$ of the mineral with formation of sodium titanate occurs. The temperature necessary ranges between 280° and 650° C., with most of the reaction taking place in the temperature range of 400° to 500° C. For complete reaction in a conveniently short time it is better to have a finishing temperature of 600° to 650° C. Temperature and time are to a certain extent reciprocal. With the proportion of soda stated and the temperatures indicated, the mixture does not fuse. In using a solution of caustic soda, the mixture is at first pasty but as drying and calcining go on it becomes a loose powder.

Caustic potash may be used in lieu of caustic soda but it is not better. In addition to the caustic alkali, I generally use a little carbonated alkali as a sort of diluent of the mass. It does not enter into reaction with the $TiO_2$ under the conditions indicated, but its presence is useful in maintaining the dry condition of the mass during heating and also improves operation in the subsequent leaching of the heated material. It is useful to have about 1 part of soda ash by weight present for each 4 parts of NaOH.

In a specific embodiment of this invention, using a batch of convenient size, 100 pounds of ground commercial rutile of about 80 mesh fineness were thoroughly mixed with 100 pounds of caustic soda, used in the form of a 75 per cent solution. Mixture was in an ordinary heated kneading apparatus and during mixing 25 pounds of dry soda ash were stirred in. Stirring was continued until the mixture reached a temperature of about 300° C. Some drying occurred but the mixture at 300° was still a thick paste. This paste was then directly transferred to a rotary externally heated calcining furnace wherein it gradually hardened and then fell down to a pulverulent mass. In this particular operation the temperature was carried to the range 600–650° C. and calcination at this temperature was continued for about 30 minutes. No stirring or hand work was required. At the end of the time of heating, the product was a fine granular powder containing about 46 per cent $TiO_2$ soluble in acid and only about 0.5 to 1 per cent unattacked rutile. With calcining temperatures below 600° a considerably longer calcination period is required for a substantially complete attack on the rutile. On the other hand, at temperatures around 650° a calcination period of 30 minutes is sufficient.

Returning to the product in the calciner, it was a fine granular powder containing titanium dioxide and combined soda in about the proportion of sodium metatitanate, $Na_2TiO_3$. Sodium metatitanate ordinarily occurs in well defined crystals, whereas the calcined product formed in the present invention is a loose, open-textured material, much better adapted for chemical treatment. On leaching with hot or cold water, it yields up most of its soda, this soda representing both the sodium carbonate present and the caustic soda reacting to form a titanate. Substantially all the carbonate and from 80 to 90 per cent of the original caustic soda may be recovered in this way. The leached residue contains $TiO_2$ and the iron oxide, or other impurities of the original material; these other materials being, however, in a substantially non-reactive form. The soda still remaining in the leached product may be readily removed by extraction with quite dilute sulfuric acid. In this extraction not much iron or other impurity dissolves.

The titanium oxide may be readily extracted from the leached, or leached and acid washed material by sulfuric acid of about 50 per cent concentration. Somewhat weaker and somewhat stronger acids may be used in this extraction. By varying the concentration of the acid used in extraction, solutions of titanic dioxide containing almost any strength can be obtained within the limits of, say, 90 to 300 grams per liter. It is not necessary to have sufficient acid present to form a neutral titanium salt, since part of the titanium dissolves or disperses as a basic salt or as colloidal $TiO_2$.

From solutions of $TiO_2$ in sulfuric acid obtained as just described the $TiO_2$ may be readily obtained by hydrolysis in the heat. For example, a sulfuric acid extract of the reaction mixture containing 200 to 300 grams of $TiO_2$ per liter will deposit 85 to 95 per cent of its titanium content on being kept at or near its boiling point for 3 or 4 hours. The precipitate is fairly pure, but its purity may be enhanced by exposing the solution to reducing conditions to an extent sufficient to reduce $Fe_2O_3$ to $FeO$. It is better to have the reduction extend beyond the iron to the titanium; that is to reduce the solution until a small percentage of the titanium is reduced to the trivalent state. In so doing, an iron-free precipitate is obtained in hydrolysis. During the boiling operation, it is desirable to work under a reflux condenser or to retard evaporation by a floating layer of paraffin or oil. Higher temperatures and pressures may also be used in effecting precipitation; for example, the solution obtained on extracting the reaction mixture with sulfuric acid may be heated under pressure to 105 to 110° C. for 3 or 4 hours.

In the particular operation recited ante, leaching with water was done in countercurrent and continued until about 85 per cent of the caustic content was removed. The leached material was then treated to remove residual soda, treatment being with 25 pounds of 66° Bé. sulfuric acid, used as a 5 to 10 per cent solution, the material being then washed. The $TiO_2$ in the washed material was then extracted by the action of stronger acid. In dissolving the $TiO_2$ with the stated batch, that is, with 100 pounds rutile, there was used 200 pounds of 66° Bé. acid diluted to about a 50 per cent solution. Solution was effected at a temperature between 60 and 80° C.

Instead of using the calcined product as a source of titanium sulfate, it may be used to produce any other desired titanium compound. The contained sodium metatitanate is quite reactive. Where the calcined product of the present invention is used as described for producing $TiO_2$ by hydrolysis, the precipitate is a body well adapted for pigmentary purposes. When washed free of acid, dried and heated to incandescence, it yields a pigment of excellent hiding power.

Instead of heating the reaction mixture as a loose powder or granular body, the wet mass obtained by kneading rutile or ilmenite with caustic soda solution may be briquetted, with or without a binder, and calcined in that form.

The caustic soda solution obtained in leaching the reaction mixture with water may be used on another batch, if necessary with causticization. However, in ordinary operation but little causticization is required; the caustic soda reappearing in the leachings.

What I claim is:

1. In recovering titanium compounds from rutile, the process which comprises mixing ground rutile with caustic soda in amount at least sufficient to produce sodium titanate, heating the mixture without fusion, under conditions allowing escape of moisture, to temperatures ranging from about 280° to 650° C., and thereafter removing caustic soda and recovering $TiO_2$ from the residues without further heating to high temperatures.

2. The process of claim 1 in which the caustic soda is mixed with the rutile in the form of a concentrated aqueous solution.

3. The process of claim 1 in which caustic soda is removed by leaching with water and the residue is further purified by a treatment with sulfuric acid to produce a crude reactive $TiO_2$.

4. The process of claim 1 wherein a small proportion of soda ash is added as an inert diluent to the mixture containing caustic soda.

5. The process of claim 1 in which the $TiO_2$ is recovered, after removal of the caustic soda, by dissolving the residues in sulfuric acid and effecting precipitation of $TiO_2$ by hydrolysis of the resulting solution.

HARTMUT W. RICHTER.